United States Patent Office 2,944,332
Patented July 12, 1960

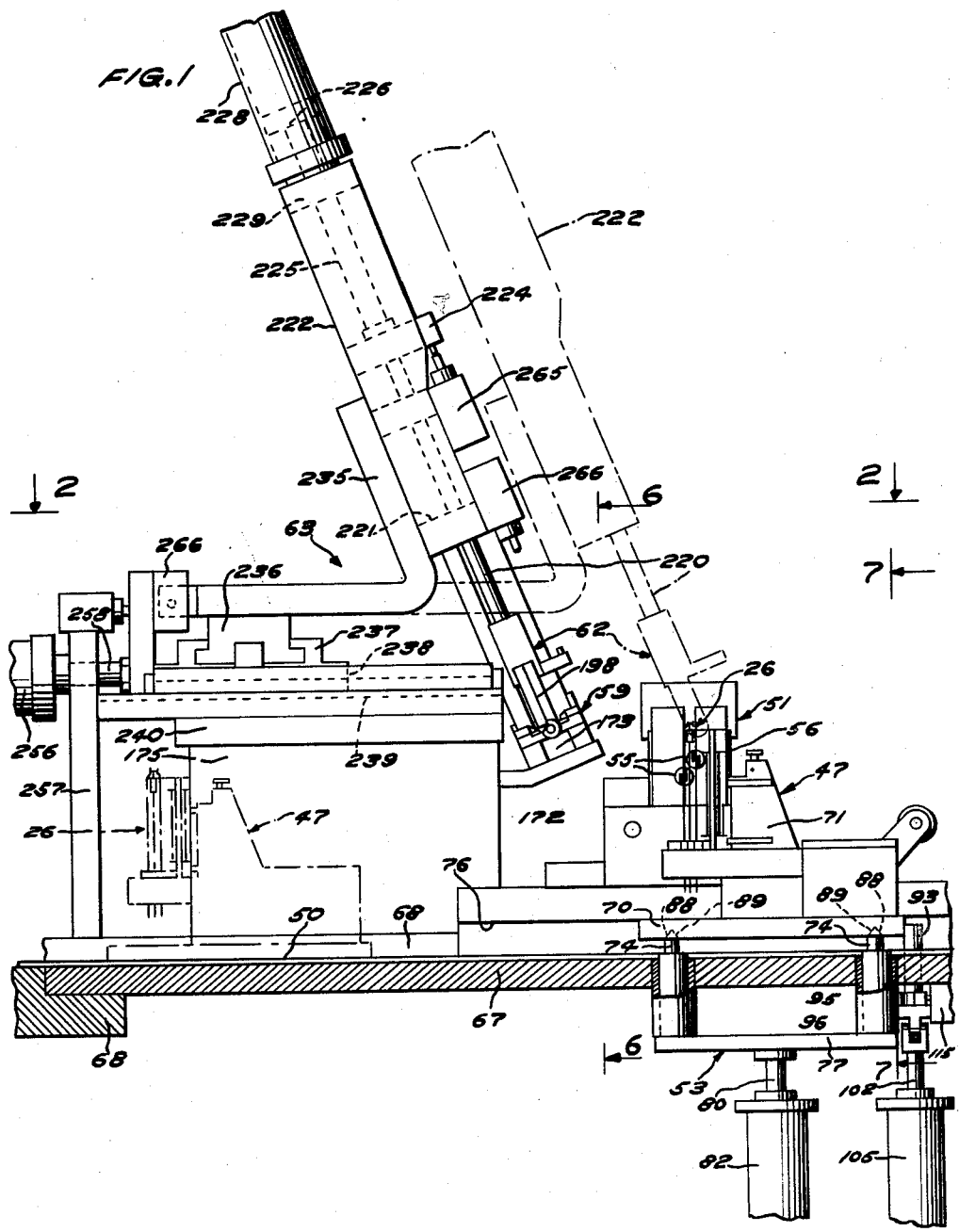

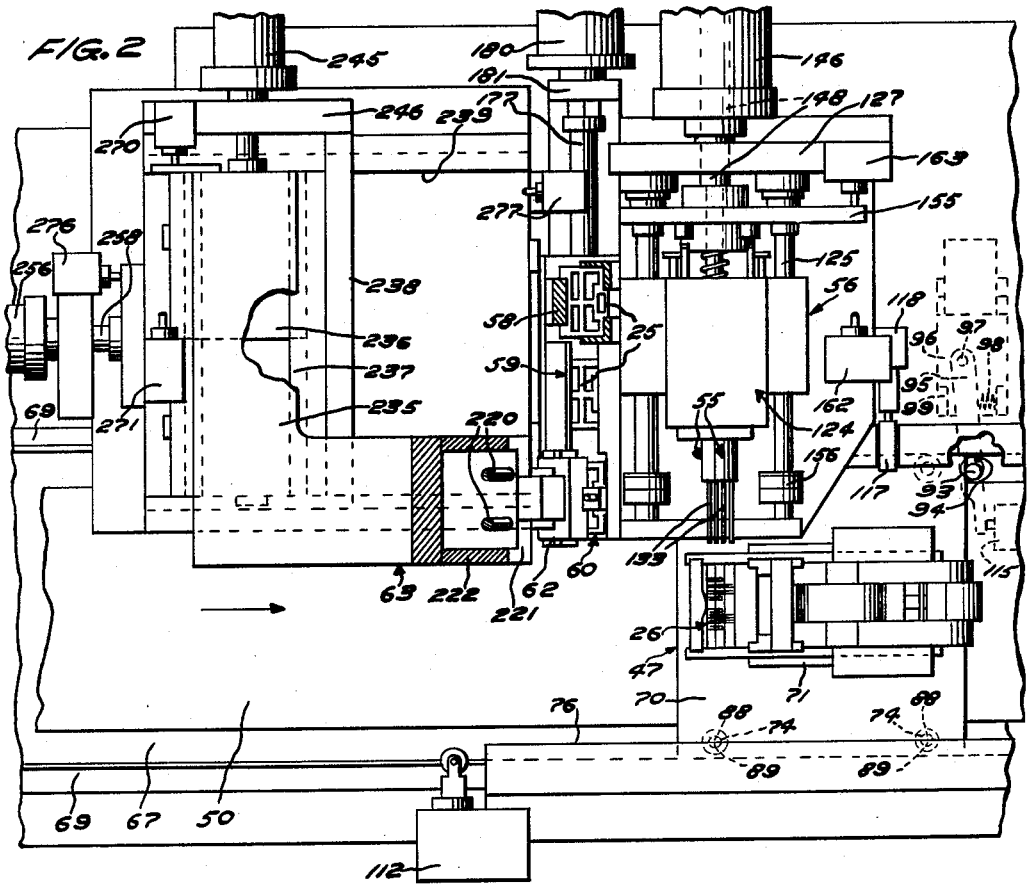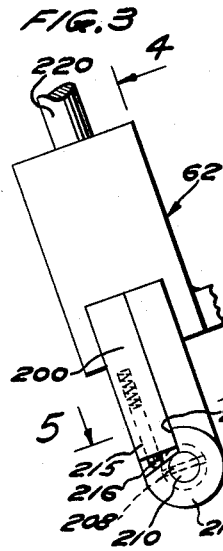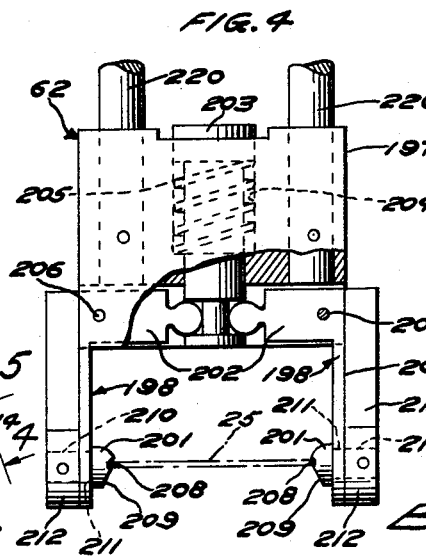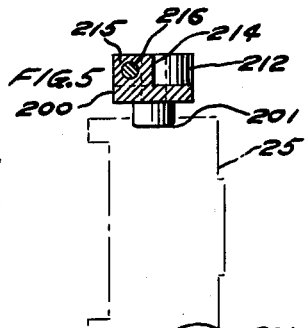

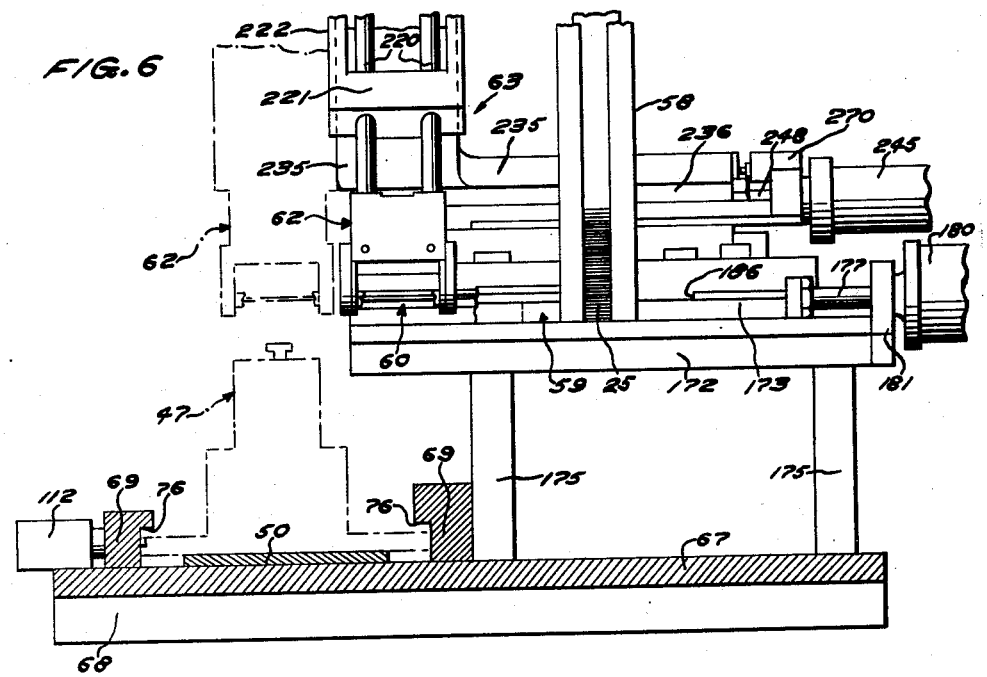
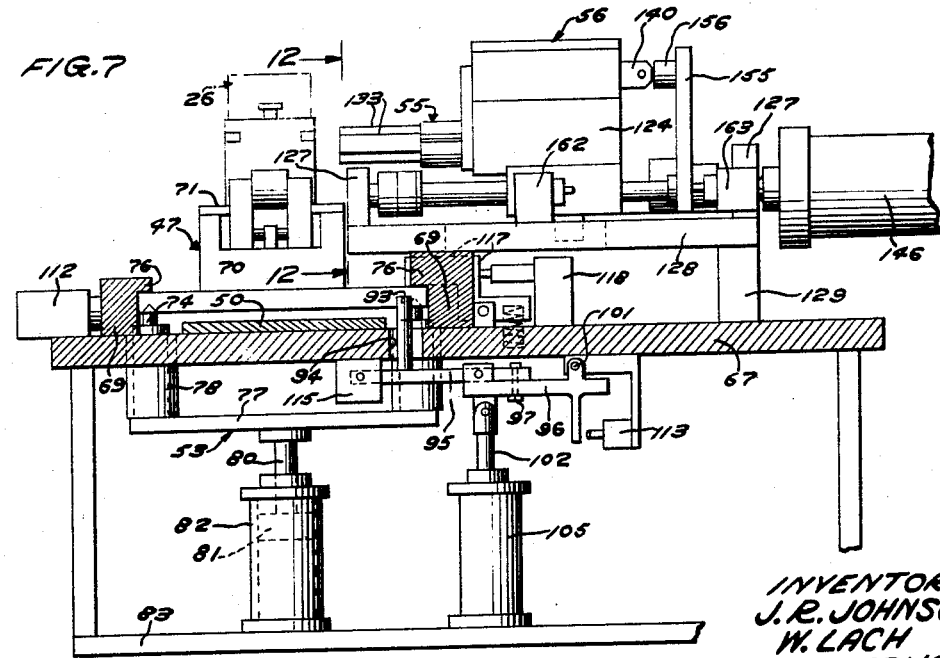

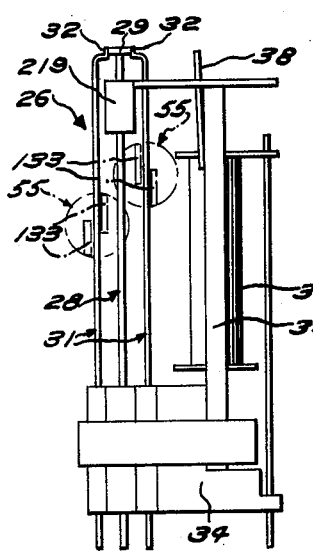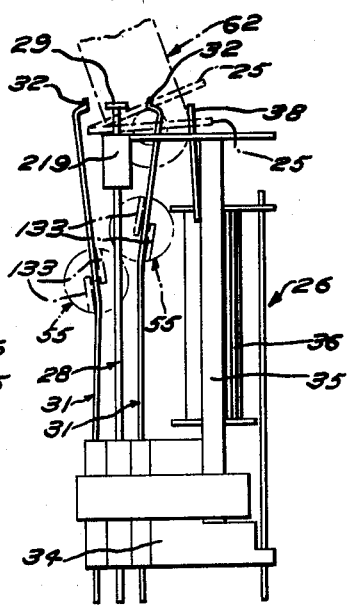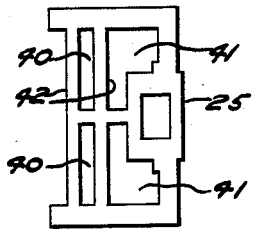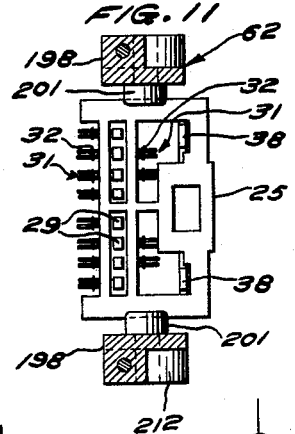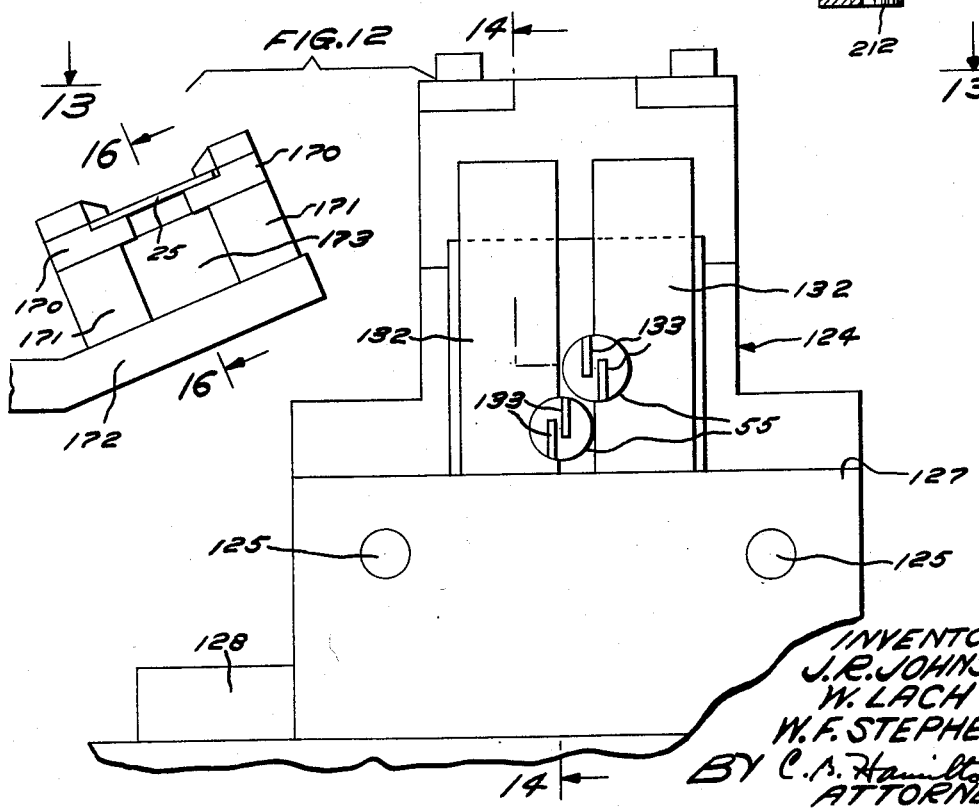

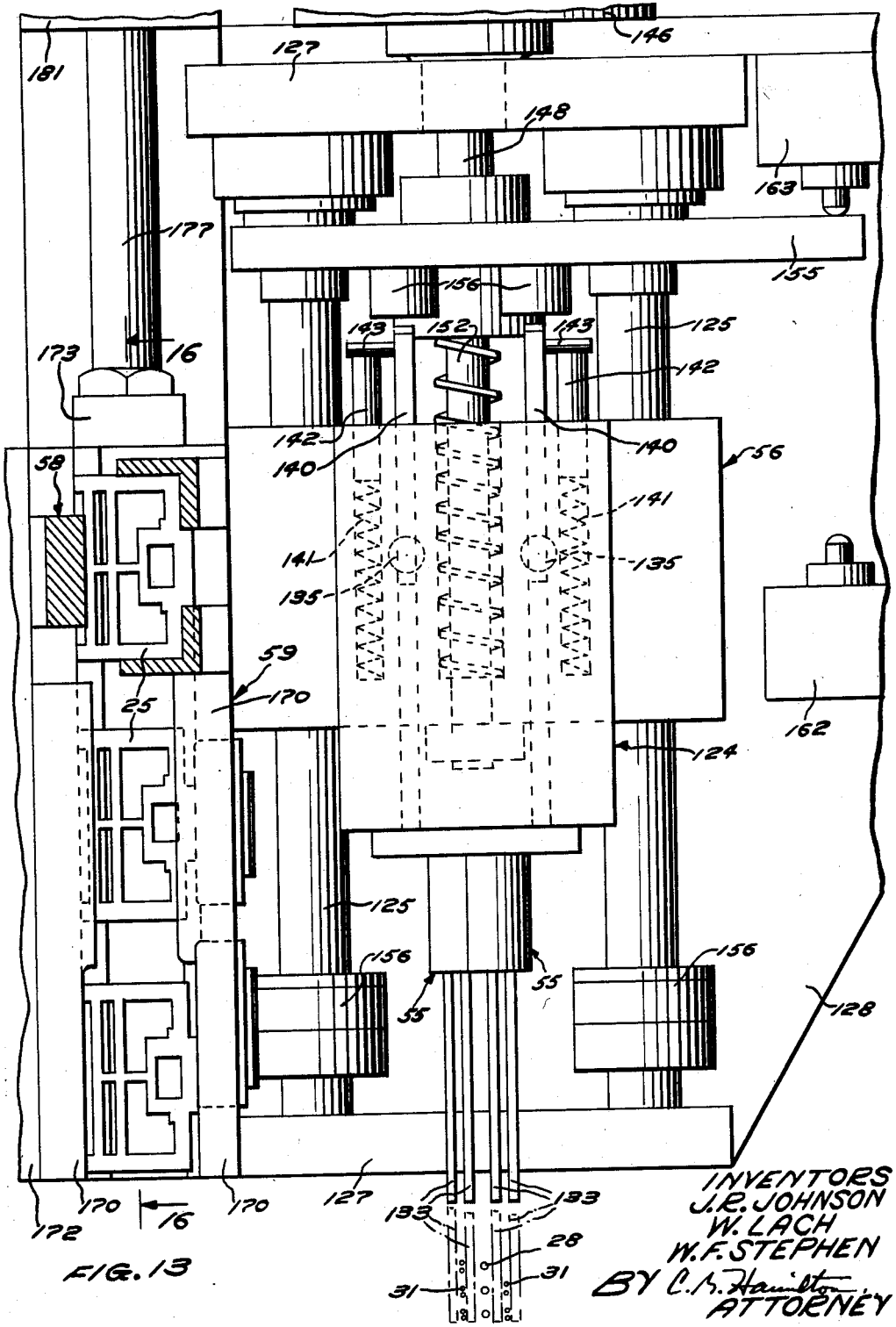

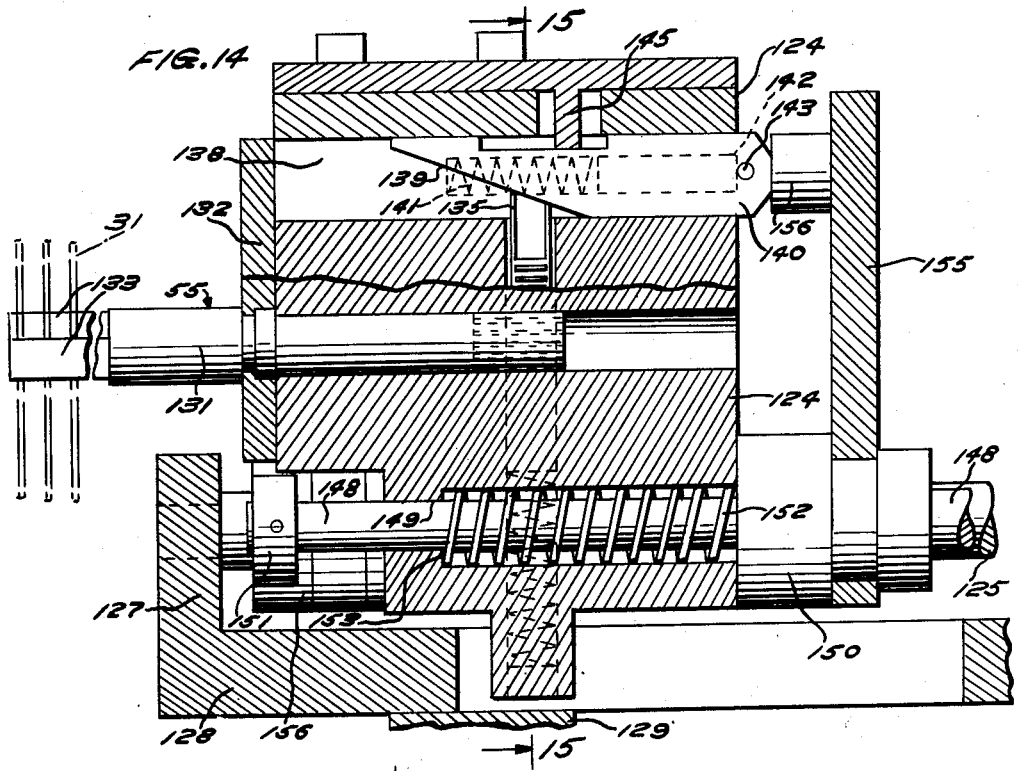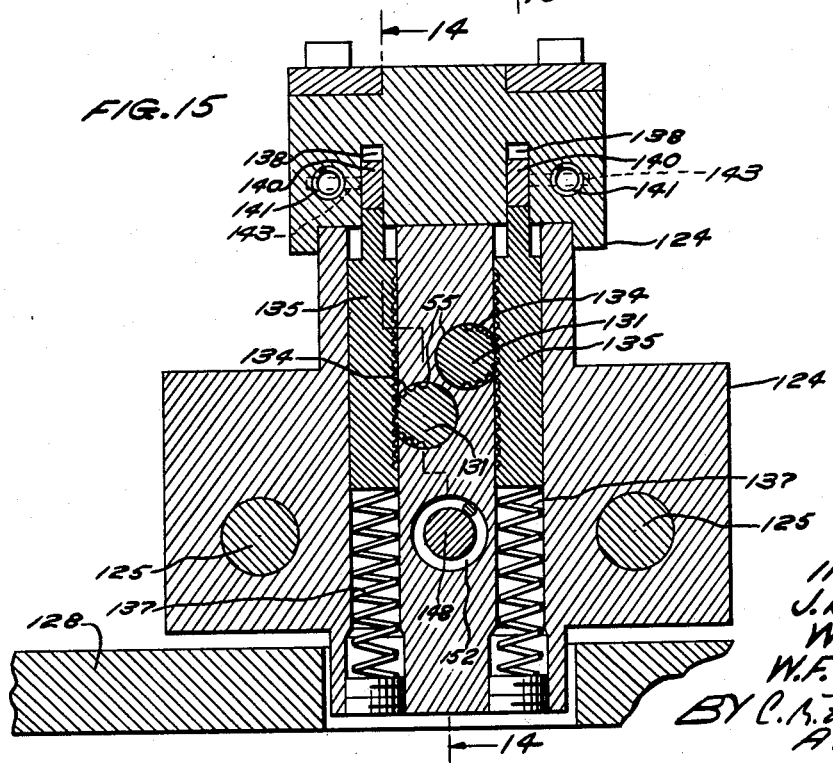

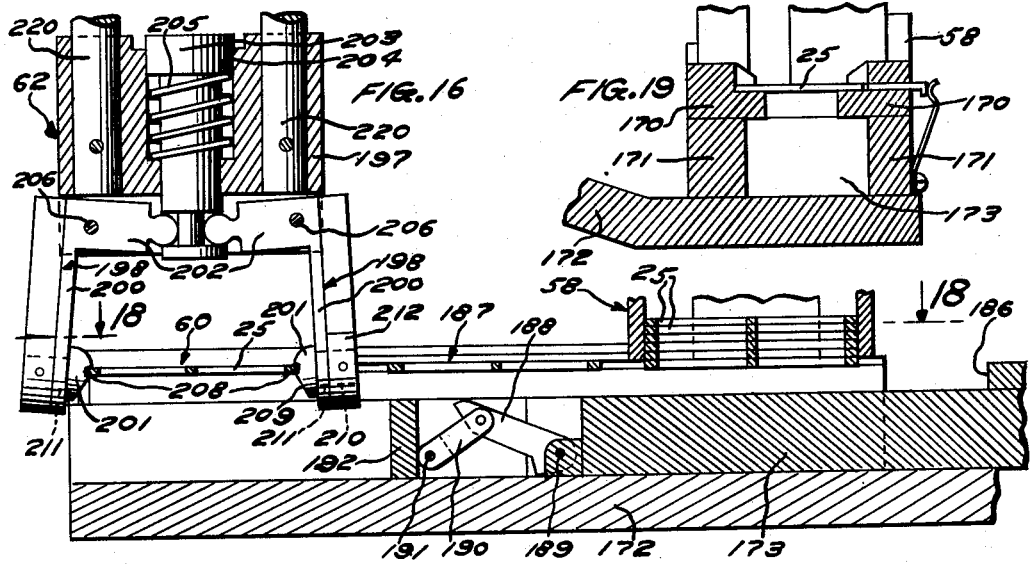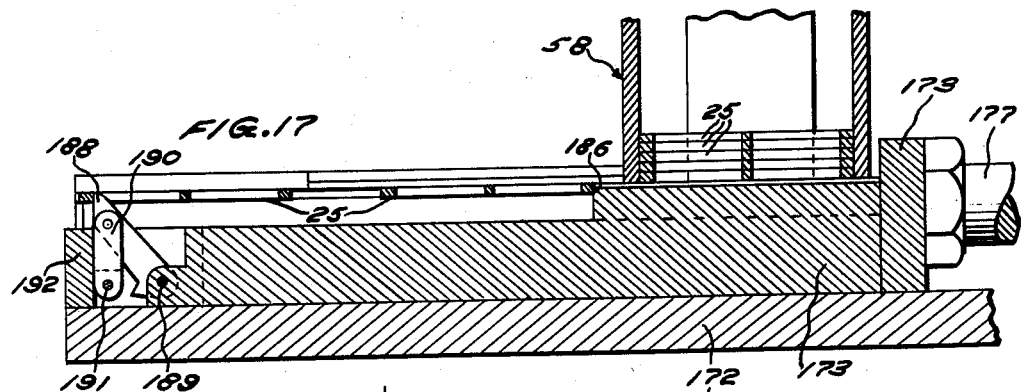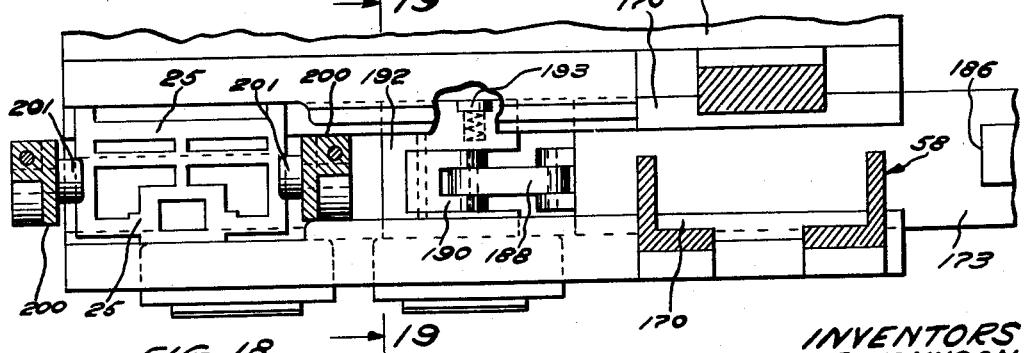

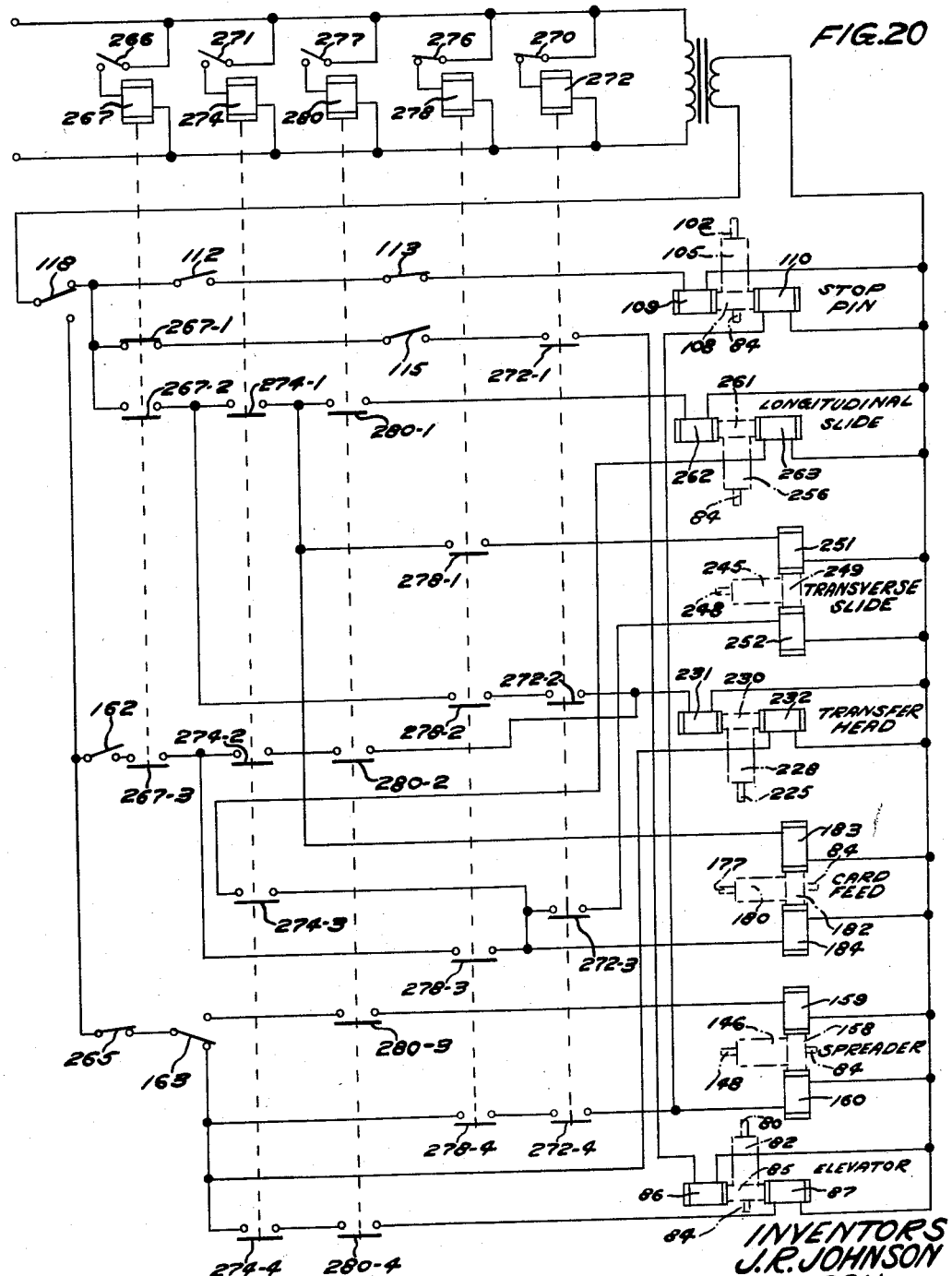

2,944,332
APPARATUS FOR ASSEMBLING OPERATING CARDS ONTO WIRE SPRING RELAYS

Joel R. Johnson and Walter Lach, Chicago, and William F. Stephen, Elmwood Park, Ill., assignors to Western Electric Company, Incorporated, New York, N.Y., a corporation of New York Filed Feb. 26, 1957, Ser. No. 642,511

10 Claims. (Cl. 29—203)

This invention relates to article assembling apparatus and more particularly to an apparatus for assembling apertured operating cards onto wire spring relay components.

An object of the present invention is to provide an efficient and effective apparatus for assembling operating cards onto wire spring relay components.

Another object of the invention is to provide an article assembling apparatus having a moving conveyor for advancing components of the article to and from an assembling station and having means for raising the components from the moving conveyor and locating them accurately in a predetermined position in the assembling station.

An apparatus illustrating certain features of the invention may include a holder for supporting a relay component having a row of stationary contact springs and a pair of rows of movable contact springs engageable with the stationary contact springs. The holder with a relay component therein is placed on a belt conveyor and advanced thereby to an assembling station into engagement with an aligning mechanism which raises the holder from the belt conveyor and locates it in a predetermined position with the movable contact springs aligned with a pair of elongated slotted spreading members which are moved longitudinally to receive the movable contact springs therein and are then oscillated to spread the movable contact springs and separate them from the stationary contact springs. A supply of relay operating cards are supported in a magazine and are fed successively therefrom to a card transfer member which is actuated yieldably to grip an operating card and move it down over the ends of the separated contact springs after which the spreading members are actuated to effect the return of the movable contact springs to their normal position to engage the operating card and cause it to be released from the transfer member as the transfer member is moved therefrom. The holder with the assembled card and relay component is then lowered onto the belt conveyor and moved from the assembling station.

Other objects and advantages of the invention will become apparent by reference to the following detailed description and the accompanying drawings illustrating a preferred embodiment thereof, in which:

Fig. 1 is a fragmentary front elevational view of the relay and card assembling apparatus;

Fig. 2 is a fragmentary plan sectional view of the apparatus taken on line 2—2 of Fig. 1;

Figs. 3 and 4 are fragmentary front and side views of a card transfer head of the apparatus;

Fig. 5 is a sectional view of the card transfer head taken on line 5—5 of Fig. 3 and showing a card supported therein in dotted lines;

Fig. 6 is a fragmentary vertical sectional view of the apparatus taken on line 6—6 of Fig. 1 showing a portion of the mechanism for spreading the contact springs;

Fig. 7 is a fragmentary vertical cross sectional view of the apparatus taken on line 7—7 of Fig. 1 and showing a portion of the mechanism for spreading the contact springs;

Fig. 8 is a simplified side elevational view of a wire spring relay component and showing in dotted lines the members for spreading the movable contact springs;

Fig. 9 is a side elevational view of the relay component showing the movable contact springs in separated relation to the stationary contact comb and showing in dotted lines two positions of a card being assembled thereon;

Fig. 10 is a face view of an operating card which is to be assembled onto the relay component with the present apparatus;

Fig. 11 is a sectional view through the card transfer head showing a card supported thereby in relation to the separated stationary and movable contact springs of the wire spring relay;

Fig. 12 is an elevational view of a portion of the apparatus looking in the direction of the arrows 12—12 of Fig. 7 and showing the contact spring spreading mechanism and a portion of the card feeding mechanism;

Fig. 13 is an enlarged fragmentary plan sectional view of the apparatus taken on line 13—13 of Fig. 12 and showing the contact spring spreading mechanism in its normal retracted position and a portion of the card feeding mechanism;

Fig. 14 is a fragmentary vertical sectional view through a portion of the contact spring spreading mechanism taken on lines 14—14 of Figs. 12 and 15;

Fig. 15 is a vertical sectional view through the spreading mechanism taken on line 15—15 of Fig. 14;

Fig. 16 is a fragmentary longitudinal sectional view through the card feeding mechanism taken on line 16—16 of Figs. 12 and 13 and showing the card transfer head in position for picking up a card;

Fig. 17 is a fragmentary longitudinal sectional view through the card feeding mechanism similar to Fig. 16 showing portions thereof in a different position;

Fig. 18 is a fragmentary plan sectional view of a card feeding mechanism taken on line 18—18 of Fig. 16;

Fig. 19 is a fragmentary vertical sectional view of the card feeding mechanism taken on line 19—19 of Fig. 18; and Fig. 20 is a wiring diagram of the electrical control system for the apparatus.

Referring to the drawings, particularly Figs. 8–11, the present invention is designed to assemble operating cards 25 (Fig. 10) onto components 26 of wire spring relays (Figs. 8 and 9). The relay components 26 each have a row of stationary contact springs 28 and a pair of rows of movable contact springs 31 on opposite sides thereof. The stationary contact springs 28 comprise relatively rigid wires with rectangular contacts 29 bonded to the upper ends thereof and the movable contact springs 31 comprise flexible wires with the upper end portions thereof offset and provided with contacts 32 engageable with the stationary contacts 29. The lower ends of the contact springs 28, 31, 31 are secured in a block 34 of dielectric material to which is also secured an iron core member 35 on a portion of which is mounted an electro-magnetic coil 36 for effecting the actuation of an armature 38.

The card 25 has a pair of aligned slots 40, a pair of apertures 41, and a pair of transverse bars 42. When the card 25 is assembled onto the relay component 26 the stationary contact springs are positioned in the slots 40 and the bars 42 of the card are positioned between the stationary contact springs 28 and the movable contact springs 31. Portions of the armature 38 are positioned in the apertures 41 for actuating the card and moving the movable contact springs alternately into and out of engagement with the stationary contact springs.

The apparatus generally comprises a plurality of holders or carriers 47 (Figs. 1, 2, and 7) for releasably supporting the relay components 26 in a predetermined position therein. The relay holders 47 are supported on a belt conveyor 50 and sequentially moved thereby into an assembling station 51 (Fig. 1) where the relay holder actuates an elevator mechanism 53 which raises the relay holder from the belt conveyor 50 to a predetermined elevation and locates the holder and the article in a predetermined operative position with the rows of movable contact springs 31, 31 in alignment with a pair of slotted spreading members 55 of a spreading mechanism 56. The spreading mechanism is then actuated to move the spreading members 55 into the relay component to receive the rows of contact springs 31 in the slots thereof after which the spreading members are rotated to flex the upper portions of the contact springs as shown in Fig. 9 to spread the contacts 32 and position them in spaced relation to the stationary contacts 29 for the reception of the card 25. A supply of the cards 25 is supported in a magazine 58 of a card feeding mechanism 59 (Figs. 2 and 6) which feeds successive cards from the magazine to a pickup position 60 where the card is engaged and yieldably retained by a transfer member or head 62 of a transfer mechanism 63 which is actuated to transfer the card from the feeding mechanism into assembled relation with the relay as shown in Fig. 9. The spreading members 55 are then reversely oscillated to allow the movable contact springs 31 to return to their normal position to engage and grip the bars 42 of the card and cause the card to be released from the transfer head 62 as the head moves away from the relay. With the card 25 assembled on the relay 26, the elevating mechanism 53 is actuated to lower the holder 47 and the assembled card and relay therein onto the belt conveyor 50 which carries it from the assembling station.

The various operating mechanisms of the apparatus are supported on a suitable framework including a horizontally disposed frame plate 67 which is supported on a bench 68 or other suitable supporting means. The conveyor belt 50 is continuously driven and is advanced on the frame plate 67 between a pair of guide rails 69 which guide the holders 47 along a predetermined path into the assembling station 51.

The relay holder 47 (Figs. 1 and 7) comprises a rectangular base plate 70 which normally rests on the belt 50 between the guide rails 69 and has a relay clamping and positioning means 71 extending upwardly therefrom for supporting the relay thereon in a predetermined fixed position. As shown in Fig. 7 portions of the plate 70 of the relay holder project laterally beyond the belt 50 and are adapted to be engaged by four elevating rods 74 of the elevator mechanism 53 and to be raised thereby from the belt into a predetermined elevation in engagement with laterally extending overhanging positioning ledges 76 on the guide rails 69. The elevating rods 74 connected to a cross head 77 and are guided for vertical movement in guide bushings 78 on the frame plate 67. The cross head 77 of the elevating mechanism 53 is connected to a rod 80 of a piston 81 vertically reciprocable in a cylinder of a fluid actuator 82 which is supported on a platform 83. Compressed air from an air line 84 is supplied to the actuator 82 through a valve 85 which is shifted from one position to the other by a pair of solenoids 86 and 87 (Fig. 20). The reduced upper ends of the elevating rods 74 (Figs. 1 and 7) have tapered or conical end surfaces 88 which engage in conforming recesses 89 in the base plate 70 for accurately locating the holder 47 horizontally in a predetermined position with the movable contact springs 31 of the relay in alignment with the spreader members 55.

Control mechanism is provided for actuating the elevating mechanism 53 in response to the movement of the relay holder 47 to the assembling position 51. This mechanism includes a stop pin 93 (Figs. 2 and 7) which extends through an aperture 94 in the frame plate 67 and is movable from a normal retracted position to an upper operative position in the path of travel of the relay holder 47. The pin 93 extends upwardly from an arm 95 which is pivotally connected to an arm 96 for limited horizontal movement about a vertical pivot 97 and is urged by a spring 98 into engagement with a stop 99 on the arm 96. The arm 96 is pivotally mounted on the underside of the frame plate 67 for vertical oscillatable movement about a horizontal pivot 101, and the arm 96 is pivotally connected to a rod 102 of a piston reciprocable within a fluid actuator 105 for raising and lowering the stop pin 93. The actuator 105 is supported by the frame 83 in fixed relation to the frame plate 67 and air from the air line 84 is admitted to opposite ends of the actuator 105 under control of a valve 108 (Fig. 20) which is shifted from one position to another by solenoids 109 and 110.

The solenoid 109 is energized in response to actuation of a normally open switch 112 (Figs. 2, 6, 7, and 20) which is mounted on the frame plate 67 adjacent to one of the guide rails 69 and is actuated by the relay holder 47 as it is carried by the belt conveyor 50 toward the assembling position 51. The energization of the solenoid 109 effects the reversal of the valve 108 and the movement of the stop pin 93 from its lower inoperative position to its upper position in the path of the holder 47. As the arm 96 is actuated to raise the stop pin 93 it also trips a switch 113 mounted on the underside of the frame plate 67 (Fig. 7) to deenergize the solenoid 109. As the relay holder 47 is advanced by the belt 50 it strikes the stop pin 93 and moves it laterally, causing the end of the arm 95 to trip a switch 115 (Figs. 2, 7, and 20). This effects the energization of solenoid 86 and the actuation of the actuator 82 and the elevator mechanism 53 to cause the elevator pins 24 to centralize the relay holder 47 thereon and then clamp it firmly against the stop ledges 76 with the relay component 26 in a predetermined assembling position. As the plate 70 of the relay holder 47 is being raised from the belt, it moves a trip lever 117 pivotally mounted on the frame plate 67 to actuate a switch 118 which initiates a cycle of operation of the spreader mechanism 56.

As seen most clearly in Figs. 7 and 12–15, the mechanism 56 for actuating the spreader members 55 comprises a head 124 which supports the spreading members 55 and is mounted slidably on a pair of horizontal guide rods 125. These guide rods are mounted at their ends in the upturned portions 127 of a frame member 128 which is fixedly supported above and in spaced relation to the frame plate 67 by a spacer block 129 and one of the guide rails 69 (Fig. 7). The spreading members 55 comprise cylindrical rods 131 rotatably supported in apertures in the head 124 and held against axial movement by locking plates 132 secured to the head and having portions thereof fitting in annular grooves in the rods. The fingers 133 on the forward end of the slotted or forked spreading members 55 are relatively thin and are spaced apart to receive the contact springs 31 therebetween as shown in Fig. 8. Gear teeth 134 on the end portions of the spreading members 55 (Fig. 15) mesh with gear teeth on rack bars 135 which are mounted slidably in vertically disposed bores in the head 124 and are urged upwardly by springs 137. The upper reduced ends of the rack bars 135 fit in narrow horizontally disposed slots 138 in the head 124 and have inclined end surfaces thereon engageable with the inclined surfaces 139 of cam bars 140 which are slidably mounted for horizontal movement in the slots 138 for imparting downward movement to the rack bars. The cam bars 140, which are shown in their forward or operative position in Fig. 14, are returned to their normal inoperative position by springs 141 which are mounted in bores in the head 124 and transmits motion to the cam bars 140 through the medium of rods 142 in the bores and pins 143 on the bars 140. Shoulders 144 on the cam bars 140 cooperate with stops 145 fixedly mounted on the head 124 for limiting the rearward movement of the cam bars 140 and the extent of oscillatory movement of the spreader members 55.

Means including a fluid actuator 146 (Figs. 2 and 7) are provided for sequentially actuating the spreader mechanism to move the spreader head 124 from an inoperative position (Figs. 2 and 7) to an operative position (Fig. 14) with the fingers 133 of the spreader members 55 encompassing the movable contact springs 31 to oscillate the spreader members 55 and spread the contact springs 31 to open position as shown in Fig. 9 to permit the assembly of the card 25 onto the relay, to oscillate the spreader members 55 reversely to their normal position and permit the contact springs 31 to close on the card 25, and to return the head 124 and the spreader members 55 from their operative position to their inoperative position. The spreader actuator 146 is secured to one of the upstanding portions 127 of the frame member 128 and has a reciprocable piston rod 148 (Fig. 2) which extends through an aperture 149 in the head 124 (Fig. 14) and has a collar 150 on one side of the head and a collar 151 on the other side thereof. A compression spring 152 on the piston rod 148 has one end thereof abutting the collar 150 and the other end thereof abutting a shoulder 153 of the head 124 formed by the counterbored portion of the aperture 149. Mounted fixedly on the collar 150 of the piston rod 148 is a plate or cross arm 155 which is slidably guided on the guide rods 125 and carries a pair of abutments 156 for actuating the cam bars 140.

In response to actuation of the piston rod 148 toward the left from its retracted or inoperative position as viewed in Fig. 7, the spring 152 will move the head 124 to its operative position (Fig. 14) in which it is stopped by engagement with stop collars 156 on the guide rods 125 and upon continued movement of the piston rod 148 the spring 152 is compressed and the abutments 156 on the cross arm 155 engage and actuate the cam bars 140 to effect the oscillation of the spreading members 55 and the flexing of the contact springs 31 to their open or spread position (Fig. 9). After the card 25 has been assembled into the relay 26 and in response to the initial return movement of the piston rod 148 while the spring 152 maintains the head 124 in its forward operative position, the cross head 155 and the abutment 156 moves away from the head 124 and the cam bars 140 are returned thereby to their normal inoperative position to effect the reverse oscillation of the spreader members 55 to their normal position, at which time the collar 151 on the piston rod 148 engages the head 124 and returns it to its normal retracted position to withdraw the spreader members 55 from the relay.

The spreader actuator 146 is connected to the air supply line 84 and the movement of the piston is controlled by a valve 158 which is shifted from one position to another by solenoids 159 and 160. Switches 162 and 163 (Figs. 2, 7, and 20) are actuated by the cross head 155 at the end of each stroke of the spreader actuator.

Referring now to Figs. 2, 6, and 16–19, the cards 25 are stacked in the magazine 58 with the lowermost card of the stack resting in the rabbeted grooves of a pair of guide rails 170 which guide the cards for movement from the magazine to the pickup position 60 where the cards are picked up by the transfer head 62 and transferred onto the relay component 26 as previously referred to. The guide rails 170 in cooperation with a pair of blocks 171 and a frame plate 172 (Figs. 16 and 19) form a guideway for supporting a feed bar 173. The frame plate 172 is supported on spacer blocks 175 mounted on the frame plate 67 (Fig. 6) and a portion of the plate 172 is inclined to tilt the magazine 58 and the card feeding mechanism to a predetermined angle to aid in feeding and transferring the cards in an oblique position onto the relay component. The feed bar 173 is connected to a piston rod 177 of a piston reciprocable within a fluid actuator 180 which is secured to an upstanding frame member 181 on the frame plate 172. The actuator 180 is connected to the compressed air supply line 84 and the movements of the actuator and the feed bar are controlled by a valve 182 which is shifted from one position to another by solenoids 183, 184 (Fig. 20). The cards 21 are moved from the magazine into the pickup station 60 in two steps in order to shorten the stroke of the actuator 180. A shoulder 186 on the feed bar 173 engages the lowermost card of the stack and advances it to an intermediate position 187 (Fig. 16) in response to a feeding stroke of the feed bar 173 and on the following feed stroke a feed pawl 188 pivotally connected to the feed bar at 189 engages the card in the intermediate position 187 and advances it to the pickup position 60. The feed pawl 188 is pivotally connected to a cooperating link 190 to form a toggle. The link 190 is pivotally mounted at 191 to a member 192 which has a spring pressed shoe 193 (Fig. 18) frictionally engaging a side wall 171 of the guide to create a drag on the member 192. This causes the toggle links 188 and 190 to straighten out into an inoperative position (Fig. 16) during the return stroke of the feed bar and to move the toggle links into an operative position (Fig. 17) to cause the feed pawl 188 to engage the card and advance it from the intermediate position 187 to the pickup position 60 during the feeding stroke of the feed bar.

The transfer head 62 (Figs. 1–6 and 16) comprises a member 197 on which are mounted a pair of bell crank levers 198 for pivotal movement about pivots 199. Downwardly extending arms 200 of the bell cranks are provided with card supporting members 201 for yieldably retaining a card 25 therein. Laterally disposed arms 202 of the bell cranks engage in an annular groove in a headed rod 203 which is mounted in a counterbored aperture 204 in the member 197 and is urged upwardly by a spring 205 to rock the bell cranks and move the members 201 toward each other into gripping engagement with a card. The card supporting members 201 have transverse grooves 208 for receiving and releasably retaining the ends of cards 25 therein and have sloping surfaces 209 below the grooves for camming the arms 200 of the bell crank outwardly when the transfer head 62 is moved down into engagement with a card. The members 201 have reduced cylindrical shanks 210 which extend through and are rotatably mounted in apertures 211 in the arms 200 and have collars 212 pinned to the shanks on the other side of the arms for retaining the members on the arms. As shown in Fig. 3 the collars 212 are notched at 214 to receive the lower end portions of ribs 215 on the arms 200 of the bell crank levers for limiting the rotation of the cam members 201. Pins 216 mounted in bores in the ribs 215 are urged by springs 217 into engagement with the collars 212 to stress the card holding member 201 for rotation to a normal position with the card engaging slot 208 obliquely disposed to receive the obliquely positioned card 25 in the pickup station 60. The oscillatable mounting of the card supporting members 201 permit the card to be turned from its oblique position to a horizontal position by a block 219 of dielectric (Fig. 9) on the stationary contact springs 28 during the assembly of the card onto the relay component.

The transfer head 62 is secured to the lower ends of a pair of rods 220 which are mounted slidably in a lower end portion 221 of a rectangular box-like carrier 222. At their upper ends the rods 220 are secured to a cross head 224 which is slidable within the side portions of the carrier 222 and is connected to the end of a piston rod 225 of a piston 226 reciprocable within a fluid actuator 228. This actuator is secured to the upper end portion 229 of the carrier 222 and has a valve 230 which is connected to the air line 84 and is actuated by a pair of solenoids 231, 232 for controlling the reciprocation of the transfer head 62.

The carrier 222 is mounted on a bracket 235 which is fixedly secured to a slide 236, which in turn is mounted for sliding movement transversely of the direction of travel of the conveyor belt 50 in a guide 237. The lower portion of the guide 237 forms a slide 238 which is mounted in a guide 239 for guiding the transfer head 62 for longitudinal movement parallel to the travel of the belt conveyor 50. The guide 239 is supported on a stationary frame plate 240 which is mounted on the vertical frame members 175. Transverse movement is imparted to the slide 236 and the transfer head 62 by a fluid actuator 245 (Figs. 2 and 6) stationarily mounted in a frame member 246 and having a reciprocable piston rod 248 connected to the slide 236. The actuator 245 has a valve 249 (Fig. 20) which is actuated by a pair of solenoids 251, 252. Longitudinal movement is imparted to the slide 238 and the transfer head 62 by a fluid actuator 256 which is mounted on a stationary frame member 257 (Figs. 1 and 2) and has a piston rod 258 connected to the slide 239. The actuator 256 has a valve 261 which is connected to the air supply line 84 and is actuated by a pair of solenoids 262 and 263 (Fig. 20).

The actuators 228, 245, and 256 cooperate to move the transfer head 62 to its upper position from its lower position at the pick up station 60 as shown in Figs. 1 and 6, then laterally move the transfer head 62 with the card 25 therein to a position disposed above the belt conveyor 52, then move the transfer head longitudinally to its forward position, and, then, while the movable contact springs 31 are spread apart, move the transfer head downwardly to assemble the card onto the relay as shown in Fig. 9 and remain there while the spreader members 55 are actuated to cause the combs 31 to return to their normal positions in engagement with the card 25. The transfer head 62 is then raised to its upper position, releasing the card as it moves up, and the transfer head is then returned longitudinally to its retracted position, then returned laterally, and then lowered into the pick-up station 60 to pick up another card.

The transfer head 62 supports the card 25 obliquely and as it descends during the card assembling stroke, lowers the card 25 along an oblique path relative to the relay component 26 so that in the event the slots 40 of the card 25 are slightly misaligned relative to the row of rectangular stationary contacts 29 of the relay component, the edge of one of the bars 42 of the card 25 will engage the vertical side edges of the stationary contacts and will be shifted laterally thereby in the transfer head 62 sufficiently to allow the card 25 to pass over the contacts 29 into assembled relation with the movable and stationary contact springs 31 and 28.

A plurality of control switches are provided for controlling various portions of the card transferring mechanism 63 and the movement of the transfer head 62. On the rectangular carrier frame 222 are mounted control switches 265 and 266 (Figs. 1 and 20) which are actuated by movement of the transfer head 62 at each end of the stroke. The control switch 266 actuated in response to movement of the transfer head 62 to and from its upper position effects the actuation of relay 267 and its contacts 267–1, 267–2, and 267–3. Control switches 270 and 271 (Figs. 2 and 20) mounted on the longitudinal slide 238 are actuated in response to movement of the transverse slide 236 to and from its retracted and its advanced positions. The switch 270 controls the energization of a relay 272 and the actuation of its contacts 272–1, 272–2, 272–3, and 272–4 in response to movement of the transverse slide to and from its retracted position and the switch 271 effects the actuation of relay 274 and its contacts 274–1, 274–2, 274–3, and 274–4. Stationarily mounted in the path of movement of the longitudinal slide 238 are switches 276 and 277 which are actuated in response to reciprocable movement of this slide, the switch 276 controlling the actuation of relay 278 and its contacts 278–1, 278–2, 278–3, and 278–4 and the switch 277 controlling the actuation of relay 280 and its contacts 280–1, 280–2, 280–3, and 280–4.

Operation of the apparatus

A holder 47 with a relay component 26 therein is carried by the continuously moving belt conveyor 50 toward the assembling station 51 and trips the switch 112 which energizes the solenoid 109 and effects the operation of the stop pin actuator 105 and the movement of the stop pin 93 to its upper position. As the stop pin goes up the switch 113 is tripped and breaks the circuit to the solenoid 109. As the holder 47 continues its advancing movement it strikes the stop pin, thus tripping the switch 115. This completes a circuit to and energizes the solenoid 86 and effects the operation of the elevator actuator 82 and the elevator 53 to raise the holder 47 from the belt conveyor 50 and accurately position it in the assembling station 51 with the contact springs 31 of the relay 26 located in alignment with the spreader members 55. As the elevator goes up it trips the switch 118 which breaks the circuit to the elevator solenoid 86, and closes a circuit through switches 265, 163 to effect the energization of solenoid 232 and the operation of the transfer head actuator 228 to move the card transfer head 62 to its upper position. The tripping of the switch 118 also energizes the solenoid 110 of the stop pin actuator 146 to effect the return of the stop pin 83, and also energizes the solenoid 160 to effect the operation of the spreader actuator 146 sequentially to advance the spreader members 55 into forward operative position encompassing the movable contact springs 31 as shown in Fig. 8 and then oscillate the spreader members to flex and spread the upper portions of contact springs 31 to open position as shown in Fig. 9.

At the beginning of its upward stroke the transfer head 62 trips switch 265, which breaks circuits to solenoid 160 of spreader actuator 146 and to solenoid 110 of stop pin actuator 105, and at the end of its stroke it trips switch 266 which energizes relay 267 and opens contacts 267–1 and closes contacts 267–2 and 267–3 thereof. At the beginning of the forward stroke of spreader actuator 146 the cross arm 155 thereof trips switch 163 which opens the circuits to solenoid 160 of spreader actuator 146, solenoid 110 of stop pin actuator 105, solenoid 232 of transfer head actuator 228, and solenoid 87 of elevator actuator 82. At the end of its forward stroke the cross arm 155 trips switch 162 which completes circuit to solenoid 184 of card feed actuator 180 to advance feed bar 173 and feed a card to pickup position 60 and to intermediate position 187. The tripping of switch 162 also closes circuit through contacts 278–3, 272–3 to solenoid 252 of actuator 245 to advance the transverse slide 236, which, at the beginning of its stroke, trips switch 270 to deenergize relay 272 and open contacts 272–1, 272–2, 273–3, and 273–4. At the end of its advance stroke the transverse slide 236 closes switch 271 to energize relay 274 and close its contacts 274–1, 274–2, 274–3, 274–4. The closing of contacts 274–3 energizes solenoid 263 of actuator 256 and causes the longitudinal slide 238 to advance. At the beginning of its stroke the longitudinal slide 238 opens switch 276 to deenergize relay 278 and open contacts 278–1, 278–2, 278–3, 278–4 and at the end of its stroke it closes switch 277 to energize relay 280 and close contacts 280–1, 280–2, 280–3, 280–4.

The closing of contacts 280–2 energizes solenoid 231 and operates transfer head actuator 228 to lower the transfer head 62 with the card 25 therein to the position shown in dotted lines in Figs. 1 and 9 to place the card on the relay 26. As the transfer head starts down it trips switch 266 to deenergize relay 267 and open its contacts, and at the end of its downward stroke it closes switch 265 and completes a circuit through switch 163 and contacts 280-3 to solenoid 159. This energizes the solenoid and causes the spreader actuator 146 to return the spreader mechanism and cause the spreader members 55 first to be oscillated to their normal position to effect the return of the movable contact springs 31 to their unflexed position in engagement with the card 25 and then to withdraw the spreader members 55 from the contact springs 31. At the beginning of the return stroke of the spreader mechanism the switch 162 is tripped thereby to break the circuits to solenoid 184 of card feed actuator 180, to solenoid 252 of the transverse slide actuator 245, to the solenoid 263 of the longitudinal slide 256, and to solenoid 231 of transfer head actuator 228. At the end of the return stroke of the spreader mechanism the switch 163 is tripped to break circuit to solenoid 159 of spreader actuator 146 and to complete a circuit to solenoid 232 of actuator 228 and cause the transfer head 62 to be raised from its lower card assembling position with the card interfitting with the contact springs 28, 31, 31. As the head 62 moves up the card 25 is withdrawn therefrom and the switch 265 is tripped, thereby breaking circuits to solenoid 232 of transfer head actuator 228 and to solenoid 87 of elevator actuator 82.

At the upper end of its travel the transfer head 62 again trips switch 265 which again energizes relay 267 and closes contacts 267-2, 267-3, and opens contacts 267-1. The closing of switch 265 also energizes solenoid 87 of elevator actuator 82 which returns elevator and lowers the holder 47 onto the belt conveyor 50 which carries it from the assembling station 51. As elevator descends, it trips switch 118 which energizes solenoid 183 of card feed actuator 180 to effect a return movement of the card feed bar 137, and which energizes solenoid 262 of longitudinal slide actuator 256 to effect the return of the longitudinal slide 238. The tripping of the switch 118 also energizes solenoid 251 of transverse slide actuator 245 to effect the return of the transverse slide 236. As this slide starts its return movement, it trips switch 271, thereby deenergizing relay 274 and opening its contacts, and also breaking the circuits to solenoid 183 of card feed actuator 180, to solenoid 251 of transverse slide actuator 245, and to solenoid 262 of the longitudinal slide actuator 256. As the longitudinal slide 238 starts back it opens switch 277 and deenergizes relay 280 and opens its contacts. At the end of its return stroke the transverse slide 236 closes switch 270, thereby energizing relay 272 and closing its contacts, and at the end of the return stroke of the longitudinal slide 238 it closes switch 276, thus energizing relay 278 and closing its contacts. The closing of contacts 278-2 energizes solenoid 231 of transfer head actuator 228 to effect the downward movement of the transfer head 62 to the pickup station 60 to receive a card 25 therein. At the beginning of its downward stroke the transfer head 62 opens switch 266, thereby deenergizing relay 267 and closing contacts 267-1 and opening contacts 267-2, 267-3, and also breaking the circuit to solenoid 231 of transfer head actuator 228 and at the end of its stroke it closes switch 265, thus, completing a cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for assembling an operating element onto a relay having a stationary contact spring and a movable contact spring engageable with each other, a spreader member for flexing the movable contact spring, mounting means for supporting the relay and the spreader member in predetermined positions and for movement of the spreader member relative to the relay, and means for actuating the spreader member sequentially in a first direction to a predetermined operative position between the stationary and the movable contact springs and in a second direction transversely of said first direction to flex the movable contact spring and separate the contact springs for receiving the operating element.

2. In a device for assembling cards onto a relay having a stationary contact spring and a movable contact spring engageable with each other, a spreader member for flexing the movable contact spring, mounting means for supporting the relay and the spreader member in predetermined positions and for movement of the spreader member relative to the relay, means for actuating the spreader member sequentially in a first direction to a predetermined operative position between the stationary and the movable contact springs and in a second direction transversely of said first direction to flex the movable contact spring and separate the contact springs for receiving a card, a transfer head for receiving and yieldably retaining a card, and means on said mounting means for moving the transfer head along a predetermined path to a predetermined position adjacent the relay for moving the card into interfitting relation with the contact springs of the relay.

3. In a device for assembling cards onto a relay having a stationary contact spring and a movable contact spring engageable with each other, a spreader member for flexing the movable contact spring, mounting means for supporting the relay and the spreader member in predetermined positions and for movement of the spreader member relative to the relay, means for actuating the spreader member sequentially in a first direction to a predetermined operative position between the stationary and the movable contact springs and in a second direction transversely of said first direction to flex the movable contact spring and separate the contact springs for receiving a card, a magazine supported on said mounting means for holding a supply of cards, means on said mounting means for feeding a card from the magazine to a pickup station, a transfer head for receiving and yieldably retaining a card, and means on said mounting means for moving the transfer head along a predetermined path to the pickup station to receive the card and to a predetermined card transferring position adjacent the relay for moving the card into interfitting relation with the contact springs of the relay.

4. In a device for assembling cards onto a relay component having a stationary contact spring and a movable contact spring engageable with the stationary contact spring, a spreader member having a slot for receiving the movable contact spring therein, mounting means for supporting a relay component and the spreader member in predetermined positions for movement of the spreader member toward the relay component to an operative position with the movable contact spring in the slot thereof and for oscillatory movement, means for moving the spreader member to the operative position, and means for oscillating the member to flex the spring and separate the movable and stationary contacts for receiving the card.

5. In a device for assembling cards onto a relay component having a stationary contact spring and a movable contact spring engageable with the stationary contact spring, a spreader member having a pair of parallel fingers at one end thereof for receiving the movable spring therebetween, mounting means for supporting a relay component and the spreader member in predetermined positions for movement of the spreader member toward the relay to an operative position with the movable contact spring between the fingers thereof and for oscillatory movement, means for moving the spreader member to the operative position, means for oscillating the spreader member to flex the movable contact spring and separate it from the stationary contact spring for receiving the apertured card, a transfer head for yieldably holding a card therein, and means for moving the transfer head through a predetermined path to move the card down over the upper ends of the contact springs of the relay.

6. In a device for assembling cards onto a relay component having a stationary contact spring and a movable contact spring engageable with each other, an oscillatable spreader member having a slot in one end thereof for receiving the movable spring therein, mounting means for supporting a relay component and the spreader member in predetermined positions and for supporting the slotted member for oscillatory movement and for movement toward the relay to an operative position with the movable spring in the slot thereof, actuating means for sequentially moving the spreader member axially to the operative position with the movable contact spring in the slot therein and for oscillating the spreader member to flex the movable contact spring and separate it from the stationary contact spring, and means for moving the card through a predetermined path into interfitting relation with the contact springs.

7. In a device for assembling cards onto a relay component having a stationary contact spring and a movable contact spring, a member having a slot at one end for receiving the movable contact spring therein, mounting means for supporting a relay component and the slotted member in predetermined positions and for supporting the slotted member for oscillatory movement and for movement toward the relay to an operative position with the movable contact spring in the slot thereof, means for moving the spreader member axially to and from the operative position, means for oscillating the spreader member in one direction to flex the spring and separate the ends of the contact springs and for oscillating the spreader member in a reverse direction to return the spring to its normal position, means for feeding cards to a pickup station, a card transfer head for receiving and yieldably retaining a card, means for moving the transfer head through a predetermined path to the pickup station to receive a card and to an assembling position adjacent the relay to move the card into interfitting and assembled relation to the contact springs, and control means for effecting the actuation of the spreader moving means, the spreader oscillating means, the card feeding means, and the transfer head moving means in a predetermined sequence to effect the movement of the card into assembled relation to the relay while the stationary and movable contact springs are separated.

8. In a device for assembling a card into interfitting relation with a stationary contact spring and a movable contact spring of a relay, a spreader member having a pair of parallel fingers at one end thereof for receiving the movable spring therebetween, a holder for supporting a relay component, a head for supporting the spreader member for oscillatory movement, mounting means for supporting the holder and the head in predetermined positions with the movable contact spring in alignment wtih the spreader member and for movement of the head toward the holder to an advanced position with the fingers of the spreader member on opposite sides of the movable contact spring, means including a cam movably mounted on the head for oscillating the spreader member to flex the movable contact spring and spread the upper ends of the contact springs in response to movement of the cam relative to the head, an actuator having means including a rod yieldably connected to the head for sequentially moving the head to the advanced position and then actuating the cam to oscillate the spreader member and spread the contact springs, and means for moving a card through a predetermined path into a predetermined position relative to the contact springs of the relay.

9. In an apparatus for assembling cards onto a relay, a magazine for holding a stack of cards, a reciprocable feed bar having a shoulder for moving a card from the magazine to a first position and having a pivoted feed member thereon for feeding a card from the first position to a second position in response to movement of the feed bar through a predetermined stroke, a guide for guiding the cards laterally from the magazine to the first and the second positions and for guiding the feed bar for reciprocation, a fluid actuator for reciprocating the feed bar through the predetermined stroke, the feed member being pivotally connected to the feed bar at one end and having a link pivotally connected to the other end thereof to form a toggle, and a drag member mounted slidably on the guide for pivotally supporting one end of the link and for actuating the toggle to an inoperative position to lower the feed member from engagement with and the path of movement of the card on the return stroke of the feed bar and for actuating the toggle to an operative position to raise the feed member into engagement with the card on the advance stroke of the feed bar.

10. In a device for assembling apertured cards onto wire spring relay components having a stationary contact spring and movable contact springs on opposite sides thereof engageable with the stationary contact spring, a holder for supporting the relay component in a predetermined position, a pair of wire spreading elements having slots therein for receiving the movable contact springs, means mounting the wire spreading elements in a predetermined position relative to the holder for rotation about axes in alignment with the movable contact springs and for axial movement into operative position with the movable contact springs in the slots thereof, means for sequentially moving the wire spreading elements into operative position and for simultaneously oscillating them in opposite directions through predetermined angles to flex the movable contact springs and separate the ends of the movable and stationary contact springs, and means for moving the card down over the contact springs to pass the ends of the contact springs through the apertured card.

References Cited in the file of this patent
UNITED STATES PATENTS

| | | |
|---|---|---|
| 1,904,708 | Adams | Apr. 18, 1933 |
| 2,063,955 | Schiltz | Dec. 15, 1936 |
| 2,163,716 | Turner | June 27, 1939 |
| 2,169,777 | Wertzheiser | Aug. 15, 1939 |
| 2,212,402 | Rieser | Aug. 20, 1940 |
| 2,271,077 | Judisch | Jan. 27, 1942 |
| 2,514,104 | Sutherland | July 4, 1950 |
| 2,593,081 | Wilmot | Apr. 15, 1952 |
| 2,686,357 | Weisberg | Aug. 17, 1954 |